June 27, 1950     R. B. BOURNE ET AL     2,513,230
SIDEWALK SNOWPLOW
Filed May 20, 1946     3 Sheets-Sheet 1
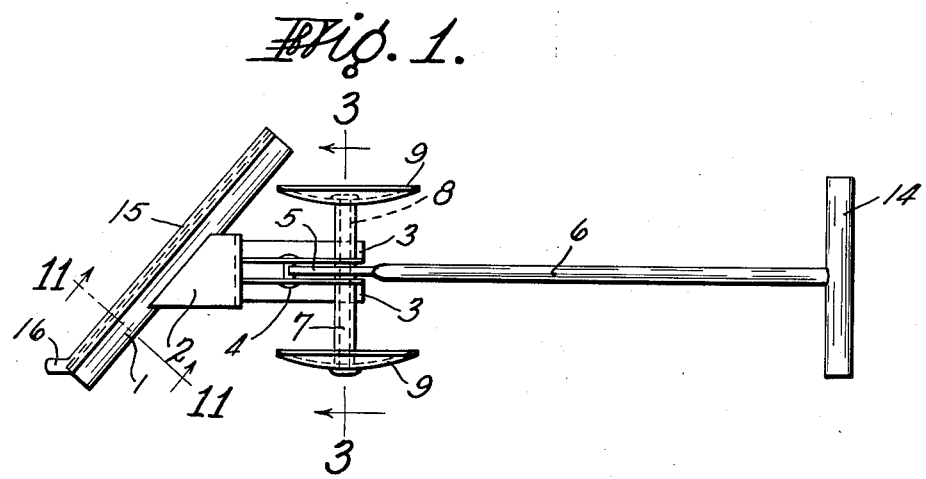
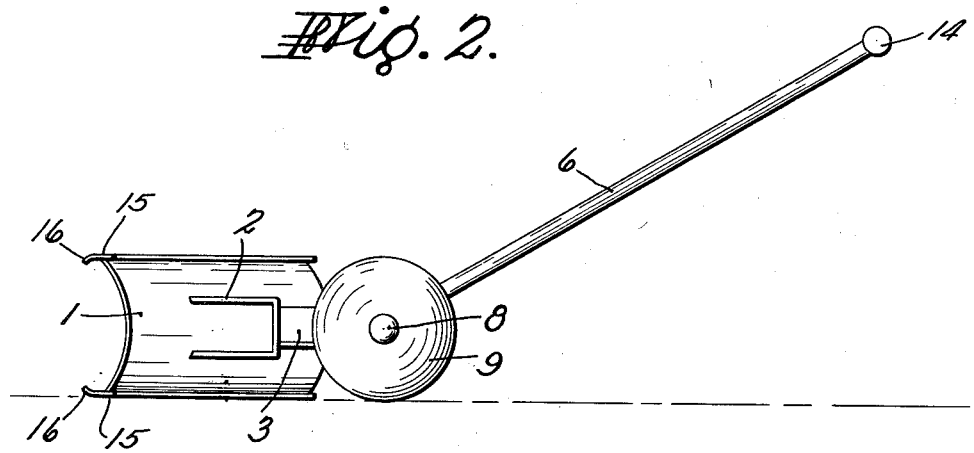
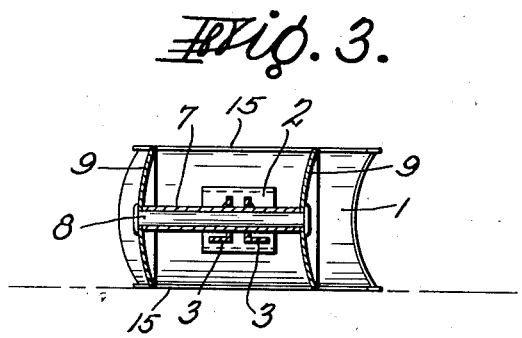
INVENTORS
ROLAND B. BOURNE AND
LESLIE E. KNAPP
BY Chapin & Neal
ATTORNEYS

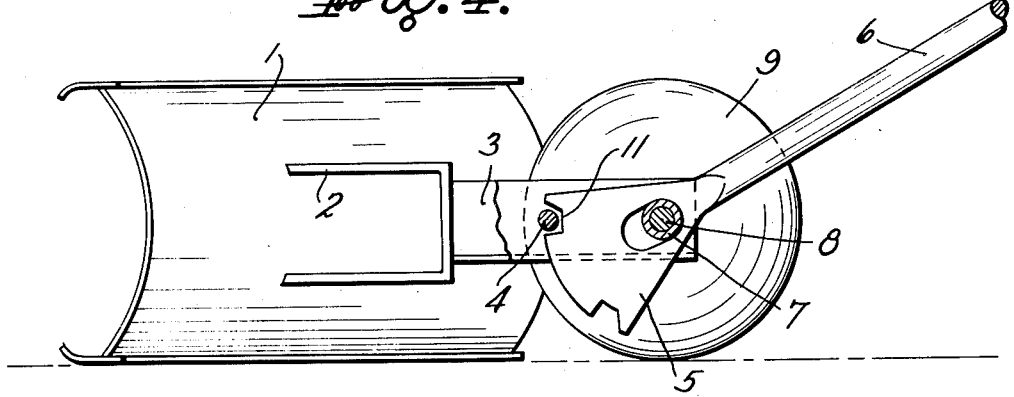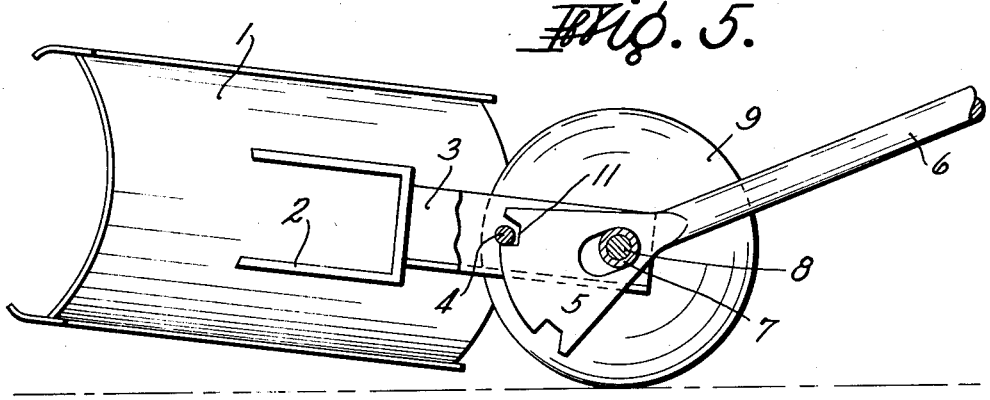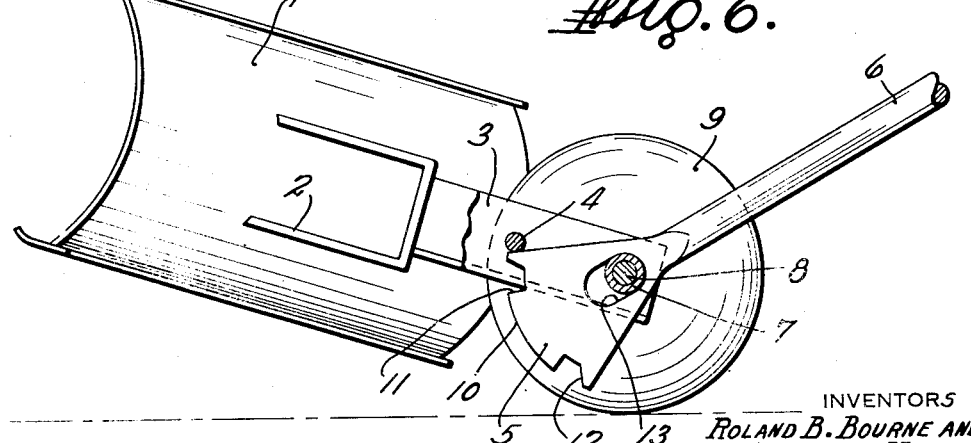

June 27, 1950  R. B. BOURNE ET AL  2,513,230
SIDEWALK SNOWPLOW

Filed May 20, 1946  3 Sheets-Sheet 3

INVENTORS
ROLAND B. BOURNE AND
LESLIE E. KNAPP
BY Chapin & Neal
ATTORNEYS

Patented June 27, 1950

2,513,230

UNITED STATES PATENT OFFICE 2,513,230

SIDEWALK SNOWPLOW

Roland B. Bourne, West Hartford, and Leslie E. Knapp, Wethersfield, Conn., assignors to The Maxim Silencer Company, Hartford, Conn., a corporation of Connecticut Application May 20, 1946, Serial No. 670,877

14 Claims. (Cl. 37—53)

This invention relates to hand operated snow plows adapted for use on sidewalks, paths and driveways, embodying various improvements over prior devices suggested for this purpose.

One object of the invention is to provide such a plow which can be operated to widen the originally plowed strip with a minimum tendency to slip sideways, so that widening, or pushing back previously turned up banks, can be done without the operator having to push sideways on the plow. V-shaped plows are laterally balanced when plowing an initial strip but are not suited for widening both because their effective width is then reduced to one-half and since their balance is then lost so that the operator must push sideways on the handle as well as ahead. Single blade plows, while retaining their effective width, have a considerable side reaction which in previous designs has made it impossible to use them on hand plows without considerable exertion. In the present invention the advantage of a single blade plow in having a constant effective width in widening is utilized, while its side thrust is neutralized by a novel wheel arrangement which sets up a counter side thrust when needed but does not interfere with the rolling of the plow in a straight line.

A further object is to provide a construction by which a single bladed plow may be caused to plow either right handed or left handed by a simple inversion of the structure and without any disassembly and rearrangement of parts. This feature is of great advantage in plowing driveways or walks where the snow has to be pushed entirely to one side and where the slope of the drive makes it desirable to push the plow always in one direction, which might not correspond to the hand for which a fixed single blade plow was set. It is also of advantage where it is desired to plow back and forth with the snow always pushed in one direction.

A further object is to provide a plow that can be used to plow to a certain depth only, as in handling a heavy snowfall where it would require too great exertion to plow the entire depth at once, and to do this without the necessity of having the handle of the plow in awkward positions. This is accomplished by providing the handle with an adjustment whereby the plow may be raised the desired amount while holding the handle in normal position. Plowing back side banks of snow is also made easier by this arrangement.

Additional objects and advantages will appear from the following description and claims:

Referring to the drawings,

Fig. 1 is a top plan of the preferred form of the invention;

Fig. 2 is a side elevation thereof;

Fig. 3 is a section on line 3—3 of Fig. 1, the handle being omitted for clearness;

Fig. 4 is an enlarged side elevation, partly in section, showing the parts in normal position;

Fig. 5 is a similar view with the plow slightly raised;

Fig. 6 is a similar view with the plow raised further;

Figure 7:
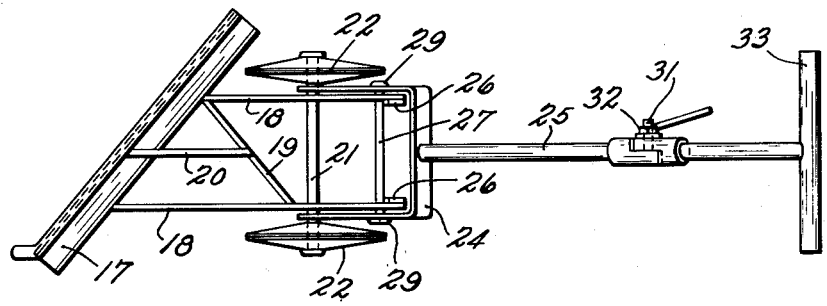
Fig. 7 is a plan view of a modification.

In the preferred form shown in Figs. 1 to 6 the moldboard 1 is set at a plowing angle of about 50° to its line of motion and is secured as by welding to a U-shaped bracket 2 having its horizontally disposed legs cut off at the same angle as that of the moldboard. The moldboard is vertically curved for strength and to assist in piling the displaced snow, and the form of bracket 2 described above allows secure attachment without the necessity of cutting the bracket on a curve. A pair of angles 3 are welded to the cross piece of the bracket so as to project rearwardly and to receive between them a cross pin 4 against which an enlargement at the lower end 5 of the handle 6 may bear as will be described. The handle itself is pivoted upon a spacing sleeve 7 passing through the vertical webs of the angle irons 3 and secured to them as by welding. A shaft 8 passes freely through the sleeve and is secured as by welding to the outer surfaces of a pair of dished wheels 9 bearing against the ends of sleeve 7.

The form of the wheels 9 is of great importance. Considering Figs. 1 and 3 it will be seen that the reaction of the snow on the moldboard will tend to push the plow to the left as the plow is moved forwardly. The wheels are dished into conical or curved shape convex toward the left, or on their sides away from the slanting front of the moldboard. As the plow is moved forwardly the rolling of the wheels produces a wedging action on the snow remaining on the ground behind the plow, or on soft ground or ice, which will tend to move the plow to the right and thus counteract the side thrust of the moldboard. This action results in keeping the plow traveling in a substantially straight line. Plain disk wheels, on the contrary, have relatively little stabilizing action. It should be noted that this tendency of the dished wheels to push the plow to the right is absent unless snow is present, so that there will be no difficulty in the plow running diagonally when it is being moved on a dry sidewalk or garage floor. The more the moldboard forces the plow sideways, however, the greater the restoring action of the wheels due to their compression of the snow; so that the stabilizing tendency automatically regulates itself as required. It is preferable to have the metal out of which the wheels are made as thin as possible, consistent with the necessary strength, in order to get a maximum tendency to dig into packed snow or ice; and it will be apparent that by reason of the additional strength given by the dished construction thinner material may be used than in the case of plain disk wheels.

To the lower end of the handle is attached a segment 10 having spaced notches 11 and 12. This segment has an elongated hole 13 embracing the sleeve 7, and of a length sufficient to permit the segment 10 to be withdrawn from engagement with the pin for repositioning it. The normal position of the handle is shown in Fig. 4, in which the cross bar 14 is in the most convenient position to be pushed upon by a user of average height. The bottom of the notch 11 is free of engagement with the pin, so that pressure is exerted on the sleeve 7 in a direction to cause a substantial force to be exerted downwardly on the wheels to increase their resistance to side thrust. It is also desirable that the circumferential extent of the notches be sufficient to allow some free movement of the segment relative to pin 4, so that the handle may be held at the most convenient angle without tending to raise or lower the moldboard. If it is desired to tilt the plow upwardly a slight amount to remove only the top portion of a heavy fall of snow, this can be done by depressing the handle as in Fig. 5. For cutting away the tops of previously plowed-up banks the plow can be raised further by withdrawing the handle to free the notch from engagement with the pin and repositioning it with the top of segment 10 under pin 4 as in Fig. 6. The plow may be tilted over on one wheel to bring the bottom of the moldboard level if desired.

Figure 10:
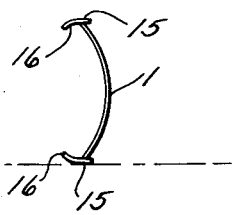
Fig. 10 is an end view of the moldboards shown in Figs. 1 and 7.
Figure 11:
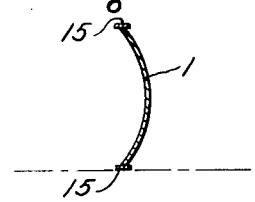
Fig. 11 is a section on line 11—11 of Fig. 1.

One feature of the present invention is that the plow is symmetrical so that it may be caused to plow either right or left handed by merely inverting it, notch 12 being here used instead of notch 11. For this purpose the moldboard is arranged vertically as shown in the end view Fig. 10, and is symmetrical with respect to a horizontal plane through its center. The wheels are preferably of a diameter substantially equal to the height of the moldboard both because a large diameter increases their gripping action and because they will thus support the moldboard in vertical position. Both edges of the moldboard have runners 15 (Figs. 1 and 11) secured to them as by welding, each having an upcurved extension 16 at the leading corner to prevent the plow digging into soft surfaces or catching on obstructions, such as frost heaved slabs, etc.

Figure 8:
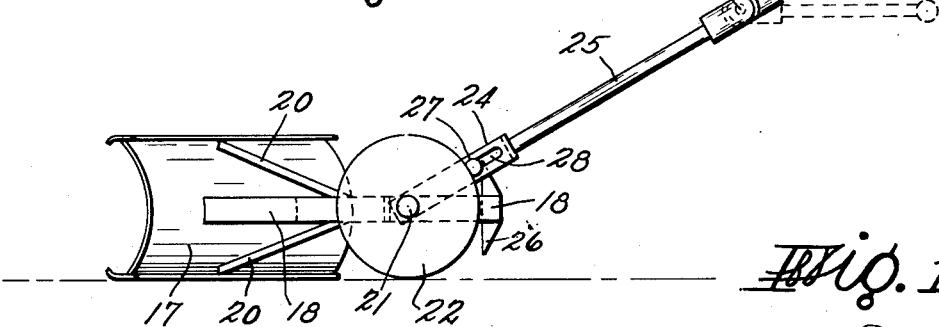
Fig. 8 is a side elevation of the device of Fig. 7.
Figure 9:
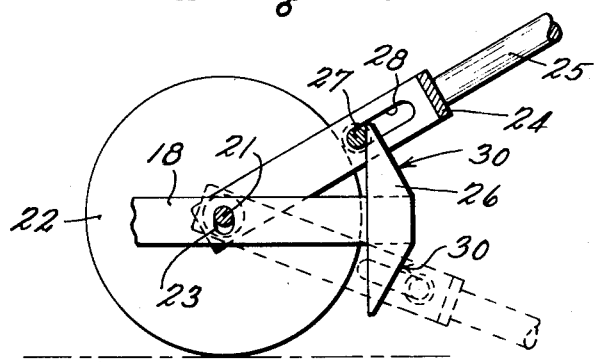
Fig. 9 is a sectional detail thereof on a larger scale.

The form shown in Figs. 7 to 9 is similar in operation, but has several changes in structure. The moldboard 17 has secured to it a frame-work comprising a pair of side members 18 joined by a diagonal brace 19, from which a pair of braces 20 run to the top and bottom of the moldboard substantially midway between its ends. The side members 18 are held parallel to the ground by the axle 21 secured at its ends to double cone wheels 22 and passing through holes 23 in the pieces 18. These holes are preferably elongated vertically (Fig. 9) so that both wheels may remain in contact with the ground even though the moldboard may be tipped sideways in following uneven contours.

The double cone shape of the wheels—preferably secured by welding at their periphery a pair of dished disks—increases somewhat the strength of the wheels and act as in the case above to prevent sideslip. Of course only the side of the wheel being pushed against the snow by the reaction of the moldboard is active in the latter respect.

The axle 21 also passes through a U-shaped bracket 24 to which the handle 25 is secured, the depth of the U being sufficient to clear the rear ends of members 18. A pair of vertical stop members 26 are secured to the pieces 18 to engage a bar 27 slidable in slots 28 in the bracket 24 and headed at 29 to keep it in place. As will be apparent in Fig. 9, the handle can be raised as desired but will be held from downward movement by the stops. This not only holds the handle in a convenient position when released but permits the moldboard to be elevated by depressing the handle. The parts are preferably so positioned that the bar 27 is just free of the stops when the handle is held in normal operating position. The backs of the stops are beveled at 30 so that the bar may clear them when moved outwardly in its slots, as when it is desired to invert the plow. The handle is provided with a hinge 31 and a clamp 32 so that its cross bar 33 may be set at any convenient height for plowing with the moldboard either in contact with the ground or elevated. With the moldboard elevated in either of the two forms the plow can be tilted readily onto one wheel so that the tops of piled-up banks may be leveled off and pushed back. The stop mechanism in this modification has the advantage that it is somewhat less susceptible to jamming with hard packing snow than the slotted and notched sector in the first form.

We claim:

1. A snow plow comprising a moldboard, a frame supporting the moldboard at a plowing angle, a pushing handle, and a pair of dished wheels of thin material journaled in the frame and convex on their sides away from the slanting front of the moldboard.

2. A snow plow comprising a moldboard, a frame supporting the moldboard at a plowing angle, a pushing handle, a pair of dished wheels of thin material journaled in the frame and convex on their sides away from the slanting front of the moldboard, the moldboard being symmetrical about a plane which passes through its center and includes the axis of the wheels, and means for holding the handle releasably at opposite angles with respect to said plane whereby the moldboard can be caused to plow either right-handed or left-handed by inverting the plow.

3. A snow plow comprising a moldboard, a frame supporting the moldboard at a plowing angle, a pair of dished wheels of thin material journaled in the frame and convex on their sides away from the slanting front of the moldboard, the moldboard being symmetrical about a plane which passes through its center and includes the axis of the wheels, a handle movable to opposite angles with respect to said plane whereby the moldboard can be caused to plow either right-handed or left-handed by inverting the plow, and stop means on the frame engaging the handle in either position whereby the moldboard may be elevated by depressing the handle.

4. A snow plow comprising a moldboard, a frame supporting the moldboard at a plowing angle, a pair of dished wheels of thin material journaled in the frame and convex on their sides away from the slanting front of the moldboard, the moldboard being symmetrical about a plane which passes through its center and includes the axis of the wheels, a handle movable to opposite angles with respect to said plane whereby the moldboard can be caused to plow either right-handed or left-handed by inverting the plow, stop means on the frame engaging the handle in either position whereby the moldboard may be elevated by depressing the handle, and means for adjusting the position of the handle with respect to said stop means to vary the elevation of the moldboard.

5. A snow plow comprising a frame, a pair of wheels journaled in the frame on a common axis, a moldboard secured to the frame at a plowing angle to the axis of the wheels and symmetrically arranged with respect to a plane passing through the center of the moldboard and including said axis, a handle having a sector having a lost motion connection about said axis and provided with an abutment on each side of the handle, and means on the frame to engage said abutments selectively to hold the handle elevated and to permit the moldboard to be raised by depressing the handle with the plow either side up.

6. A snow plow comprising a frame, a pair of wheels journaled in the frame on a common axis, a moldboard secured to the frame at a plowing angle to the axis of the wheels and symmetrically arranged with respect to a plane passing through the center of the moldboard and including said axis, said wheels being convex on their sides away from the slanting front of the moldboard, a handle having a sector having a lost motion connection about said axis and provided with an abutment on each side of the handle, and means on the frame to engage said abutments selectively to hold the handle elevated and to permit the moldboard to be raised by depressing the handle with the plow either side up.

7. A snow plow comprising a frame, a pair of wheels journaled in the frame on a common axis, a moldboard secured to the frame at a plowing angle to the axis of the wheels and symmetrically arranged with respect to a plane passing through the center of the moldboard and including said axis, a handle having a sector having a lost motion connection about said axis and provided with a pair of abutments on each side of the handle, and means on the frame to engage said abutments selectively to hold the handle elevated and to permit the moldboard to be raised to varying degrees by depressing the handle with the plow either side up.

8. A snow plow comprising a frame, a pair of wheels journaled in the frame on a common axis, a moldboard secured to the frame at a plowing angle to the axis of the wheels and symmetrically arranged with respect to a plane passing through the center of the moldboard and including said axis, said wheels being convex on their sides away from the slanting front of the moldboard, a handle having a sector having a lost motion connection about said axis and provided with a pair of abutments on each side of the handle, and means on the frame to engage said abutments selectively to hold the handle elevated and to permit the moldboard to be raised to varying degrees by depressing the handle with the plow either side up.

9. A snow plow comprising a moldboard, a frame supporting the moldboard at a plowing angle, a pushing handle, a pair of dished wheels of thin material journaled in the frame and convex on their sides away from the slanting front of the moldboard, the moldboard being symmetrical about a plane through its center and including the axis of the wheels, means for holding the handle releasably at opposite angles with respect to said plane whereby the moldboard can be caused to plow either right-handed or left-handed by inverting the plow, and supplemental means for changing the vertical angle of the handle with respect to the frame.

10. A snow plow comprising a moldboard, a frame supporting the moldboard at a plowing angle, a pushing handle, a pair of dished wheels of thin material journaled in the frame and convex on their sides away from the slanting front of the moldboard, the moldboard being symmetrical about a plane through its center and including the axis of the wheels, means for holding the handle releasably at opposite angles with respect to said plane whereby the moldboard can be caused to plow either right-handed or left-handed by inverting the plow, and a hinge and clamp for adjusting the vertical angle of the handle with respect to the frame.

11. A snow plow comprising a frame, a moldboard secured to the frame at a plowing angle, a pair of wheels journaled in the frame and being convex on their sides away from the slanting front of the moldboard, a pushing handle pivoted in the frame, a bar slidably mounted in the handle for movement toward and away from the pivot, and an abutment secured to the frame and engaging the bar rearwardly of the pivot when the handle lies on either side of the frame to permit raising the moldboard by depressing the handle, the slidable mounting of the bar permitting it to clear the abutment in shifting the handle from one side of the frame to the other to invert the plow, 12. A snow plow comprising a frame, a moldboard secured to the frame at a plowing angle, a pair of wheels journaled in the frame and being convex on their sides away from the slanting front of the moldboard, a pushing handle pivoted in the frame, a bar slidably mounted in the handle for movement toward and away from the pivot, an abutment secured to the frame and engaging the bar rearwardly of the pivot when the handle lies on either side of the frame to permit raising the moldboard by depressing the handle, the slidable mounting of the bar permitting it to clear the abutment in shifting the handle from one side of the frame to the other to invert the plow, and a clamp hinge in the handle for varying the height of its pushing end.

13. A snow plow comprising a frame, a moldboard secured to the frame at a plowing angle, a pair of wheels journaled in the frame and being convex on their sides away from the slanting front of the moldboard, a pushing handle pivoted in the frame, a bar mounted in the handle, and an abutment on the frame engaging the bar rearwardly to the pivot to permit raising the moldboard by depressing the handle, 14. A snow plow comprising a moldboard, a frame supporting the moldboard at a plowing angle, a pushing handle, a pair of wheels of thin material journaled in the frame and convex on their sides away from the slanting front of the moldboard, the moldboard being symmetrical about a plane which passes through its center and includes the axis of the wheels, and means for holding the handle releasably at opposite angles with respect to said plane whereby the moldboard can be caused to plow either right-handed or left-handed by inverting the plow.

ROLAND B. BOURNE.
LESLIE E. KNAPP.

REFERENCES CITED

The following references are of record in the file of this patent:

UNITED STATES PATENTS

| Number | Name | Date |
| --- | --- | --- |
| 645,136 | Shuart | Mar. 13, 1900 |
| 1,048,243 | Wallis | Dec. 24, 1912 |
| 2,336,553 | Leunis | Dec. 14, 1943 |
| 2,376,455 | Silver | May 22, 1945 |